(12) United States Patent
Mangolini et al.

(10) Patent No.: US 8,945,673 B2
(45) Date of Patent: Feb. 3, 2015

(54) NANOPARTICLES WITH GRAFTED ORGANIC MOLECULES

(75) Inventors: Lorenzo Mangolini, Minneapolis, MN (US); Uwe Kortshagen, Roseville, MN (US); Rebecca J. Anthony, Minneapolis, MN (US); David Jurbergs, Austin, TX (US); Xuegeng Li, Sunnyvale, CA (US); Elena Rogojina, Los Altos, CA (US)

(73) Assignees: Regents of the University of Minnesota, Minneapolis, MN (US); Innovalight, Inc., Sunnyvale, CA (US)

( * ) Notice: Subject to any disclaimer, the term of this patent is extended or adjusted under 35 U.S.C. 154(b) by 0 days.

(21) Appl. No.: 13/331,168

(22) Filed: Dec. 20, 2011

(65) Prior Publication Data

US 2012/0094033 A1    Apr. 19, 2012

Related U.S. Application Data

(63) Continuation of application No. 12/017,644, filed on Jan. 22, 2008, now abandoned.

(60) Provisional application No. 60/881,663, filed on Jan. 22, 2007.

(51) Int. Cl.
*B82Y 40/00* (2011.01)
*C23C 16/00* (2006.01)
(Continued)

(52) U.S. Cl.
CPC .............. *B01J 19/088* (2013.01); *C01B 33/02* (2013.01); *B01J 2219/0809* (2013.01);
(Continued)

(58) Field of Classification Search
None
See application file for complete search history.

(56) References Cited

U.S. PATENT DOCUMENTS 3,518,565 A    6/1970  Broekema et al. .............. 330/31
4,400,409 A    8/1983  Izu et al. ......................... 427/39
(Continued)

FOREIGN PATENT DOCUMENTS

AU    0171799    1/2002
DE    1 265 240   4/1968
(Continued)

OTHER PUBLICATIONS

Bertran et al., "Surface Analysis of Nanostructured Ceramic Coatings Containing Silicon Carbide Nanoparticles Produced by Plasma Modulation Chemical Vapor Deposition", Thin Solid Films, vol. 377-378, (2000), pp. 495-500.*

(Continued)

*Primary Examiner* — Michael Cleveland
*Assistant Examiner* — Lisha Jiang
(74) *Attorney, Agent, or Firm* — Westman, Champlin & Koehler, P.A.; Z. Peter Sawicki; Visala Goswitz

(57) ABSTRACT

An apparatus for producing grafted Group IV nanoparticles is provided and includes a source of Group IV nanoparticles. A chamber is configured to carry the nanoparticles in a gas phase and has an inlet and an exit. The inlet configured to couple to an organic molecule source which is configured to provide organic molecules to the chamber. A plasma source is arranged to generate a plasma. The plasma causes the organic molecules to break down and/or activate in the chamber and bond to the nanoparticles. A method of producing grafted Group IV nanoparticles is also provided and includes receiving Group IV nanoparticles in a gas phase, creating a plasma with the nanoparticles, and allowing the organic molecules to break down and/or become activated in the plasma and bond with the nanoparticles.

15 Claims, 2 Drawing Sheets

(51) Int. Cl.
*B01J 19/08* (2006.01)
*C01B 33/02* (2006.01)

(52) U.S. Cl.
CPC .. *B01J 2219/0835* (2013.01); *B01J 2219/0847* (2013.01); *B01J 2219/0849* (2013.01); *B01J 2219/0869* (2013.01); *B01J 2219/0875* (2013.01); *B01J 2219/0886* (2013.01); *B01J 2219/0896* (2013.01); *Y10S 977/773* (2013.01)
USPC .......... 427/220; 427/212; 427/215; 427/216; 977/773

(56) References Cited

U.S. PATENT DOCUMENTS

| | | | |
|---|---|---|---|
| 4,565,772 | A | 1/1986 | Takeoka et al. ............... 430/320 |
| 4,583,492 | A | 4/1986 | Cowher et al. ................ 118/723 |
| 4,735,143 | A | 4/1988 | Weir ............................ 101/333 |
| 5,363,021 | A | 11/1994 | MacDonald .................. 315/366 |
| 5,666,190 | A | 9/1997 | Quate et al. ..................... 355/71 |
| 5,686,789 | A | 11/1997 | Schoenbach et al. ......... 313/491 |
| 5,695,617 | A | 12/1997 | Graiver et al. ........... 304/157.41 |
| 5,958,329 | A | 9/1999 | Brown .......................... 266/176 |
| 6,096,386 | A | 8/2000 | Biebuyck et al. ............. 427/510 |
| 6,127,286 | A * | 10/2000 | Zhang et al. .................. 438/790 |
| 6,180,239 | B1 | 1/2001 | Whitesides et al. ........ 428/411.1 |
| 6,323,233 | B1 | 11/2001 | Wright et al. ................. 514/408 |
| 6,361,660 | B1 | 3/2002 | Goldstein ................ 204/157.15 |
| 6,433,480 | B1 | 8/2002 | Stark et al. .................... 313/631 |
| 6,444,697 | B2 | 9/2002 | Wright et al. ................. 514/408 |
| 6,623,559 | B2 | 9/2003 | Huang ............................ 117/87 |
| 6,688,494 | B2 | 2/2004 | Pozarnsky et al. ................ 222/4 |
| 6,703,081 | B2 | 3/2004 | Karner et al. ................. 427/562 |
| 6,776,094 | B1 | 8/2004 | Whiteside et al. ............ 101/427 |
| 7,446,335 | B2 | 11/2008 | Kortshagen et al. ............ 257/51 |
| 2001/0013313 | A1 | 8/2001 | Droopad et al. .............. 117/200 |
| 2001/0056112 | A1 | 12/2001 | Wright et al. ................. 514/414 |
| 2002/0040765 | A1 | 4/2002 | Suzuki ..................... 156/345.28 |
| 2002/0132045 | A1 | 9/2002 | Halas et al. ................... 427/217 |
| 2003/0102444 | A1 | 6/2003 | Deppert et al. .......... 250/492.22 |
| 2003/0178316 | A1 | 9/2003 | Jacobs et al. .................. 205/157 |
| 2003/0224214 | A1 * | 12/2003 | Garito et al. ............ 428/694 ML |
| 2004/0033679 | A1 | 2/2004 | Jacobson et al. ............. 438/510 |
| 2004/0046165 | A1 | 3/2004 | Hunze et al. .................... 357/13 |
| 2004/0086709 | A1 | 5/2004 | Cunningham et al. ........ 428/335 |
| 2005/0005851 | A1 | 1/2005 | Keshner et al. ............... 118/723 |
| 2005/0118338 | A1 | 6/2005 | Stebe et al. ................... 427/331 |
| 2006/0110313 | A1 | 5/2006 | Cho et al. ................... 423/561.1 |
| 2006/0116001 | A1 | 6/2006 | Wang ........................... 438/798 |

FOREIGN PATENT DOCUMENTS

| | | |
|---|---|---|
| DE | 196 12 939 | 4/1996 |
| DE | 196 38 601 | 2/1998 |
| EP | 0 480 183 | 4/1992 |
| EP | 1 297 387 | 1/2002 |
| WO | WO 98/27463 | 6/1998 |
| WO | WO 01/84238 | 11/2001 |
| WO | WO 02/03142 | 1/2002 |
| WO | WO 02/086179 | 10/2002 |
| WO | WO 03/087590 | 10/2003 |
| WO | WO 2005/039753 | 5/2005 |
| WO | WO 2006/009881 | 1/2006 |
| WO | WO 2008/017663 | 2/2008 |

OTHER PUBLICATIONS

Kouprine et al., "Polymer-like C:H Thin Film Coating of Nanopowders in Capacitvely Coupled RF Discharge", Plasma Chemistry and Plasma Processing, vol. 24 No. 2, Jun. 2004, pp. 189-216.*

Bai et al., "Monodisperse Nanoparticle Synthesis by an Atmospheric Pressure Plasma Process: An Example of a Visible Light Photocatalyst", Industrial and Engineering Chemical Research, vol. 43, (2004), pp. 7200-7203.*

"Approaching Nanoxerography: The Use of Electrostatic Forces to Position Nanoparticles with 100 nm Scale Resolution", by H. Jacobs et al., Adv. Mater., vol. 14, No. 21, Nov. 4, 2002, pp. 1553-1557.

News Report: "Nanoscale Photocopies", by P. Ball, Nature Publishing Group, Nov. 27, 2002, 4 pgs.

"Nanostructured Deposition of Nanoparticles from the Gas Phase", by T.J. Krinke, Part. Part. Syst. Charact., Aug. 2002, pp. 321-326.

News Report: "Nanoxerography Creating Nanoscale Photocopies", Nov. 25, 2002, 1 page.

News Report: ECS-0229087 CAREER: Directed Assembly of Nanoparticles; a Tool to Enable the Fabrication of Nanoparticle Based Devices, Feb. 2, 2003; 1 page.

Liao YC and Roberts JT, "Self-Assembly of Organic monolayers on Aerosolized Silicon Nanoparticles", Journal of the American Chemical Society, Abstract Only, 1 page.

Mangolini et al., "Non-Thermal Plasma Synthesis and Passivation of Silicon Nanocrystals", Mechanical Engineering Department, University of Minnesota, prior to Jul. 2009, 4 pages.

"The Dispersion Study of $TiO_2$ Nanoparticles Surface Modified Through Plasma Polymerization", by F. Thu et al., Science Direct, vol. 27, No. 4, May 2005, pp. 457-461.

"Surface Modification and Functionalization Through the Self-Assembled Monolayer and Graft Polymerization", by E. Ruckenstein et al., Advances in Colloid and Interface Science, vol. 113, No. 1, Mar. 2005, pp. 43-63.

"Plasma Spray Synthesis of Nanomaterial Powders and Deposits", by J. Karthikeyan et al., Materials Science and Engineering, vol. A238, No. 2, Jan. 1997, pp. 275-286.

"Surface Modification of SiC Nanoparticles with PMMA by Low Temperature Plasma", by W. Gang et al., Plasma Science and Technology, vol. 9, No. 1, Feb. 2007, pp. 57-61.

Banpat, A., et al., "Synthesis of highly oriented, single-crystal silicon nanoparticles in a low-pressure, inductively coupled plasma," Journal of Applied Physics 94(3), Aug. 1, 2003, pp. 1969-1974.

Oda, S., "Frequency effects in processing plasmas of the VHF band," Plasma Sources Sci. Technol., vol. 2, pp. 26-29, 1993.

Gorla, C.R., et al., "Silicon and germanium nanoparticle formation in an inductively coupled plasma reactor," J. Vac. Sci. Technol. A 15(3), May/Jun. 1997, pp. 860-864.

Lake, M.R., et al., "Properties of Powders Deposited by Silane/Hydrogen and Silane/Methane Plasmas," Journal of Non-Crystalline Solids, 109, pp. 318-326; 1989.

Zhang, D., "Visible Light Emission from Silicon Nanoparticles," Mat. Res. Soc. Symp. Proc., vol. 256, pp. 35-40m 1992.

Costa, J., et al., "Microstructural and Vibrational Characterization of the Hydrogenated Amorphous Silicon Powders," Mat. Res. Soc. Symp. Proc., vol. 297, pp. 1031-1036, 1993.

Costa, J., et al., "Preparation of nanoscale amorphous silicon based powder in a square-wave-modulated rf plasma reactor," Vacuum, vol. 45, No. 10/11, pp. 1115-1117, 1994.

Liu, X., et al., "Photoiuminescence from nanocrystalline embedded in hydrogenated amorphous silicon films prepared by plasma enhanced chemical vapor deposition," Appl. Phys. Lett., vol. 64(2), pp. 220-222, Jan. 10, 1994.

Bertran, E., et al., "Effects of plasma processing on the microstructural properties of silicon powders," Plasma Sources Sci. Technol. 3, pp. 348-354, Jan. 14, 1994.

Costa, J., et al., "Unusual photoluminescence properties in amorphous silicon nanopowder produced by plasma enhanced chemical vapor deposition," Appl. Phys. Lett., vol. 64(4), pp. 463-465, Jan. 24, 1994.

Sansonners, L., et al.., "Synthesis of PbS and $SnO_x$ nanoparticles for functional applications," J. Phys. D: Appl. Phys., vol. 27, pp. 1406-1411, Jul. 14, 1994.

Bossel, C., et al., "Processing of nano-scaled silicon powders to prepare slip cast structural ceramics," Materials Science and Engineering, A204, pp. 107-112, 1995.

Otobe, M., et al., "Fabrication of Nanocrystalline Si by $SIH_4$ Plasma Cell," Mat. Res. Soc. Symp. Proc., vol. 377, 1995, published by Materials Research Society.

Otobe, M., et al., "Nanocrystalline silicon formation in a $SiH_4$ plasma cell," Journal of Non-Crystalline Solids, 198-200, pp. 875-878, 1996.

(56) References Cited

OTHER PUBLICATIONS

I Cabarrocas, P.R., et al., "Experimental evidence for nanoparticle deposition in continuous argon-silane plasmas: Effects of silicon nanoparticles on film properties," J. Vac. Sci. Technol. A, vol. 14(2), pp. 655-659, Mar./Apr. 1996.

Oda, S., "Preparation of nanocrystalline silicon quantum dot structure by a digital plasma process," Advances in Colloid and Interface Science, 71-72, pp. 31-47, 1997.

Gorla, C.R., et al., "Silicon and germanium nanoparticle formation in an inductively coupled plasma reactor," J. Vac. Sci. Technol. A, vol. 15(3), May/Jun. 1997.

Ifuku, T., et al., "Fabrication of Nanocrystalline Silicon with Small Spread of Particle Size by Pulsed Gas Plasma," Jpn. J. Appl. Phys., vol. 36, Part 1, No. 6B, pp. 4031-4034, Jun. 1997.

Oda, S., "Fabrication of silicon quantum dots by pulsed-gas plasma processes and their properties," (Abstract), Int. Symp. Nanostructures: Phys. Technol., St. Petersburg, pp. 23-27, Jun. 1997.

I Cabarrocas, P.R., et al., "Nanoparticle formation in low-pressure silane plasmas: bridging the gap between a-Si:H and .mu.c-Si films," Journal of Non-Crystalline Solids, 227-230, pp. 871-875, 1998.

Gorer, S., et al., "Size-Selective and Epitaxial Electrochemical/ Chemical Synthesis of Sulfur-Passivated Cadmium Sulfide Nanocrystals on Graphite," J. Am. Chem. Soc., vol. 120, 9584-9593, 1998.

Hofmeister, H., et al., "Structure of nanometersized silicon particles prepared by various gas phase processes," Journal of Non-Crystalline Solids, 232-234, pp. 182-187, 1998.

Kortshagen, U.R., et al., "Generation and Growth of Nanoparticles in Low-Pressure Plasmas," Pure and Applied Chemistry, vol. 71, p. 1871, 1999.

Shi, W., et al., "Parallel Operation of Microhollow Cathode Discharges," IEEE Transactions on Plasma Science, vol. 27, No. 1, pp. 16-17, Feb. 1999.

Oda, S., et al., "Nanocrystalline silicon quantum dots prepared by VHF Plasma-enhanced chemical vapor deposition," J. Phys. IV France, vol. 11, Pr3-1065-Pr3-1071, 2001.

Shen, Z., et al., "Experimental study of the influence of nanoparticle generation on the electrical characteristics of argon-silane capacitive radio-frequency plasmas," J. Vac. Sci. Technol. A, vol. 20(1), pp. 153-159, Jan./Feb. 2002.

Prakash, G., et al., "Nonlinear optical properties of silicon nanocrystals grown by plasma-enhanced chemical vapor deposition," Journal of Applied Physics, vol. 91, No. 7, pp. 4607-4610, Apr. 1, 2002.

Viera, G., et al., "Atomic structure of the nanocrystalline Si particles appearing in nanostructured Si thin films produced in low-temperature radiofrequency plasmas," Journal of Applied Physics, vol. 92, No. 8, pp. 4684-4694, Jul. 17, 2002.

I Cabarrocas, P.R., et al., "Plasma Grown Particles: From Injected Gases to Nanoparticles and Nanomaterials, from Injected Particles to Dust Clouds in the PKE Experimental," AIP Conference Proceedings, vol. 649(1), pp. 45-52, Dec. 13, 2002.

Vollath, D., et al., "Chapter Eight:: Synthesis of Nanopowders by the Microwave Plasma Process-Basic Considerations and Perspectives for Scaling Up," pp. 219-251 from Innovative Processing of Films and Nanocrystalline Powders, ed Kwang-Leong Choy, Imperial College Press, 2002.

I Cabarrocas, P.R., et al., "Plasma production of nanocrystalline silicon particles and polymorphous silicon thin films for large-area electronic devices," Pure Appl. Chem., vol. 74, No. 3, pp. 359-367, 2002.

Shirai, H., et al., "Luminescent silicon nanocrystal dots fabricated by $SiCl_4/H_2$ RF plasma-enhanced chemical vapor deposition," Physica E, vol. 16, pp. 388-394, 2003.

Oda, S., "NeoSilicon materials and silicon nanodevices," Materials Science and Engineering, B101, pp. 19-23, 2003.

Yu, J., et al., "Structure and Magnetic Properties of $SiO_z$ Coated $Fe_2O_3$ Nanoparticles Synthesized by Chemical Vapor Condensation Process," Rev. Adv. Mater. Sci., vol. 4, pp. 55-59, 2003.

Choi, C., et al., "Preparation and Characterization of Magnetic Fe, Fe/C and Fe/N Nanoparticles Synthesized by Chemical Vapor Condensation Process," Rev. Adv. Mater. Sci., vol. 5, pp. 487-492, 2003.

Park, N., et al., "Size-dependent charge storage in amorphous silicon quantum dots embedded in silicon nitride," Applied Physics Letters, vol. 83, No. 5, pp. 1014-1016, Aug. 4, 2003.

Penache, C., et al., "Large Area Surface Modification Induced by Parallel Operated MSE Sustained Glow Discharges," printed from the web at http://hsbpc1.ikf.physik.uni-frankfurt.de/web/publications/files/PenacheH- akone2001.pdf prior to Jun. 18, 2004.

Reboredo, F., et al., "Computational Engineering of the Stability and Optical Gaps of SiC Quantum Dots," Nano Letters, vol. 4, No. 5, pp. 801-804, 2004.

International Search Report, PCT/US05/21551, Jan. 23, 2007.

Mangolini et al., "Plasma-Assisted Synthesis of Silicon Nanocrystal Inks", Advanced Materials, *Adv. Mater. 2007*, 19, 2513-2519; prior to Jul. 2009.

Non-Final Office Action from related U.S. Appl. No. 12/017,644, dated Mar. 26, 2010, 13 pages.

Final Office Action from related U.S. Appl. No. 12/017,644, dated Jan. 19, 2011, 12 pages.

Non-Final Office Action from related U.S. Appl. No. 12/017,644, dated Jun. 1, 2011, 13 pages.

Final Office Action from related U.S. Appl. No. 12/017,644, dated Sep. 22, 2011, 13 pages.

Cho et al., "The C2H2 gas effect on the growth behavior of remote plasma enhanced CVD SiC:H film", Journal of Electroceramics, vol. 17, No. 2-4, Dec. 2006.

Poortmans et al. Thin Film Solar Cells, Wiley, Nov. 2006, pp. 202.

* cited by examiner

NANOPARTICLES WITH GRAFTED ORGANIC MOLECULES

CROSS-REFERENCE TO RELATED APPLICATION

The present application is a Continuation application of U.S. Ser. No. 12/017,644 (now abandoned), filed Jan. 22, 2008 which is based on and claims the benefit of U.S. provisional patent application Ser. No. 60/881,663, filed Jan. 22, 2007, the content of which is hereby incorporated by reference in its entirety.

GOVERNMENT RIGHTS

This invention was made with government support under DMI-0556163 awarded by the National Science Foundation. The government has certain rights in this invention.

BACKGROUND OF THE INVENTION

The present invention relates to grafting of molecules onto nanoparticles. More specifically, the present invention relates to grafting of organic molecules onto Group IV nanoparticles.

Nanoparticles have recently attracted significant attention from researchers in a variety of disciplines, due to a wide array of potential applications in the fabrication of nanostructured materials and devices. Semiconductor nanoparticles, such as silicon nanoparticles, are of special interest due to their potential uses in photoluminescence-based devices, doped electroluminescent light emitters, photovoltaic devices, memory devices and other microelectronic devices, such as diodes and transistors.

In many instances, it is desirable to graft molecules onto the surface of nanoparticles. The grafting of molecules to the surface is sometimes called "passivation," but may also impart new properties to the nanoparticles. In one example prior art approach to grafting molecules, nanoparticles are collected as a powder and then transferred into mixtures of solvents and ligands molecules and reacted for several minutes to hours. This process can be used to attach the ligands to the surface of the nanoparticles. The ligand molecules should have a sufficient length such that they are able to overcome the van der Walls forces between particles to push agglomerated nanoparticles apart. Another example prior art technique is the thermal gas phase method. In the thermal gas phase method, the molecules are electrically neutral and no charge prevents them from agglomerating. In order to passivate these particles while avoiding agglomeration, the thermal method is limited to relatively small particle concentrations such that the particles remain sufficiently separated and do not agglomerate.

SUMMARY OF THE INVENTION

An apparatus for producing grafted Group IV nanoparticles is provided and includes a source of Group IV nanoparticles. A chamber is configured to carry the nanoparticles in a gas phase and has an inlet and an exit. The inlet configured to couple to an organic molecule source which is configured to provide organic molecules to the chamber. A mixture of particles and organic molecules is formed in the gas phase. A plasma source is arranged to generate a plasma. The plasma causes the organic molecules to break down and/or become activated in the chamber and bond to the nanoparticles. A method of producing grafted Group IV nanoparticles is also provided and includes receiving Group IV nanoparticles in a gas phase, creating a plasma with the nanoparticles, and allowing the organic molecules to break down and/or activate in the plasma and bond with the nanoparticles.

DETAILED DESCRIPTION OF ILLUSTRATIVE EMBODIMENTS

Figure 1:
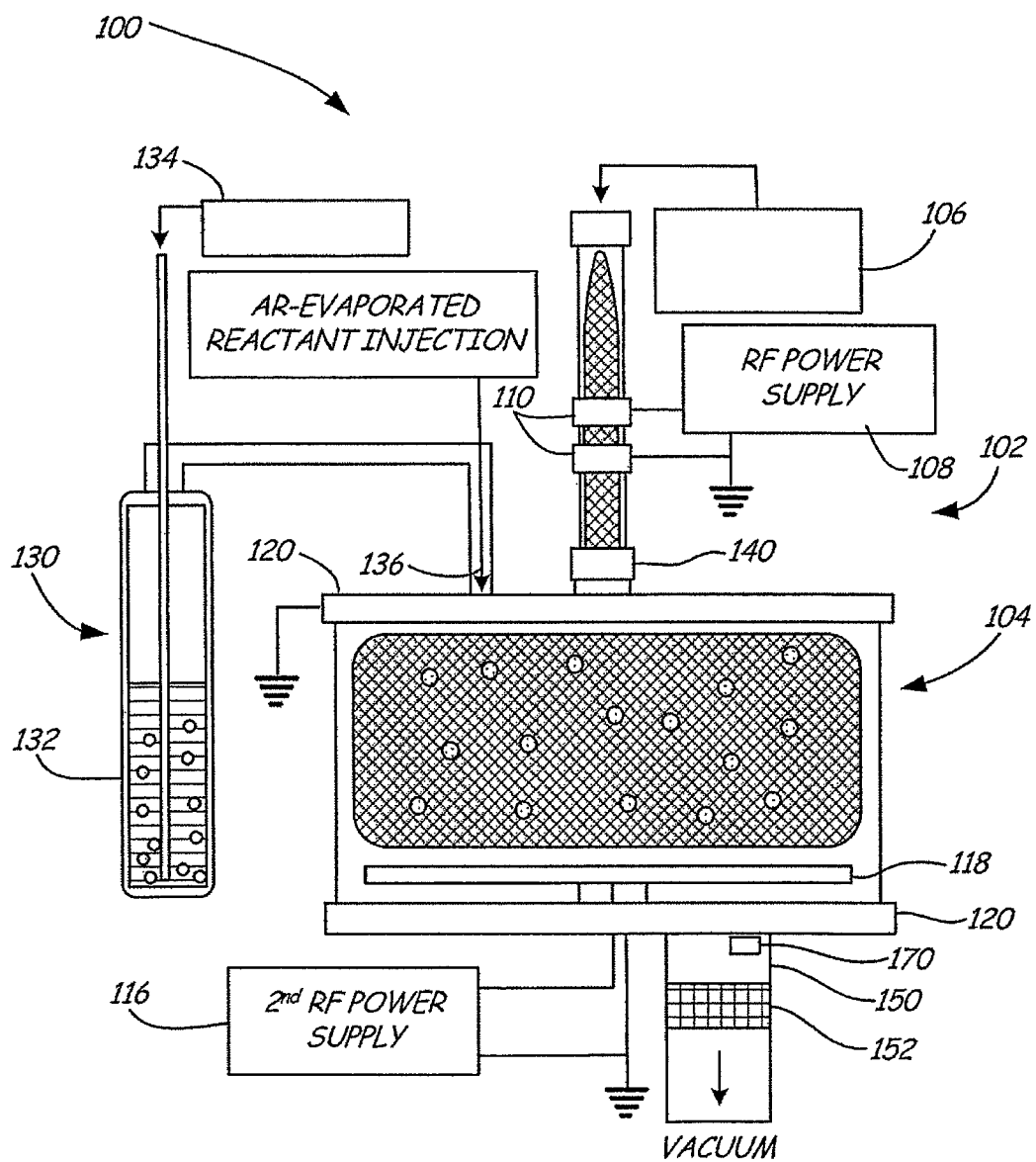
FIG. 1 is a simplified diagram showing a two stage plasma reactor in accordance with one example embodiment of the present invention.

The present invention provides an apparatus and method for grafting organic molecules onto Group IV nanoparticles. The grafting is performed with the nanoparticles in a gas phase. An organic molecule source is provided and the organic molecules break down and/or are activated in a plasma to enable their reaction with the nanoparticle surfaces.

The grafting of molecules to the surface of nanoparticles can be called "passivation", but it also imparts new properties to the nanoparticles. For example, the grafting can also make the particles soluble in various organic solvents. This is important if one wants to make a nanoparticle ink which requires, isolated, non-agglomerated particles in solution. Applications of such inks are in printable electronics and solution processable solar cells. However, the invention is not limited to this implementation.

In prior approaches to grafting molecules to particles, particles were typically collected as a powder, transferred into mixtures of solvents and ligand molecules and reacted for a period of from several minutes to hours to attach the ligands to the surface. In one example of the present invention, nanoparticles are synthesized in a first plasma in a few milliseconds and next transferred into a second plasma, in which the ligands are attached within a few hundreds of milliseconds to one second. This provides an advantage in terms of time and processing ease. Moreover, this "in-flight" method allows attaching shorter molecules than is typically possible in the liquid phase. In prior liquid phase approaches, one starts with a powder of agglomerated particles. The ligand molecules need to have a sufficient length such that they can overcome the van der Walls forces between particles to push agglomerated nanoparticles apart. In the plasma method of the invention, the surface grafting is performed on individual particles suspended in a gas stream. It is thus possible to attach very short ligands, which may be desirable for some applications such as in printed electronics.

In-flight passivation of particles can be achieved by thermal gas-phase methods, for instance by flowing the mixture of particles and organic molecules through a furnace. The plasma method of this invention differs from the thermal gas phase method in a number of aspects. In the plasma, particles are negatively charged, which significantly reduces agglomeration of individual particles. In the thermal gas-phase method, particles are electrically neutral and are not prevented from agglomerating. In order to passivate particles while avoiding agglomeration, the thermal gas-phase method is typically limited to very small particle concentrations, such that the particle agglomeration rate is lower than the reaction rate between the particles and the organic molecules. The plasma approach allows for much higher particle concentrations, as the electric repulsion between particles significantly lowers the agglomeration rate. Hence, the plasma approach will allow much larger processing rates than the thermal gas-phase method.

The invention provides other advantages such as the ability to operate with a larger range of molecules than the thermal method. Non-thermal plasma selectively heats the electrons in the plasma but leaves the background gas cold. The energetic electrons can dissociate and/or activate ligand molecules and produce reactive radicals which attach to the nanoparticle surfaces. In contrast, the thermal gas-phase method relies on thermally activating certain bonds to initiate the reaction, requiring heating of the entire gas stream to achieve a heating of the particles. Further, the thermal method requires that the ligands have certain excitable bonds, such as unsaturated C═C bonds. The plasma approach also functions with saturated molecules such as alkanes which do not have any unsaturated bonds. The techniques can be used with Group IV nanoparticles including germanium and silicon nanoparticles.

FIG. 1 is a simplified diagram showing a two stage reactor 100 in accordance with one example embodiment of the present invention. Reactor 100 includes a first plasma chamber 102 and a second plasma chamber 104. Plasma chamber 102 receives a gas from gas source 106 and includes an RF power supply connected to electrodes 110. The RF power supply 108 drives electrodes 110 with an RF signal and creates a non-thermal plasma in the gas from gas source 106 between electrodes 110. This causes nanoparticles to form from the gas. For example, if the gas is Ar—$SiH_4$—$H_2$, silicon nanoparticles will be formed in plasma chamber 102. The nanoparticles then enter second stage plasma (or passivation) chamber 104. Plasma chamber 104 includes a second RF power supply 116 which couples between electrode 118 and electrical ground 120. Plasma chamber 104 receives organic molecules in accordance with the present invention. In the configuration shown in FIG. 1, the organic molecules are from an organic molecule source 130 which comprises a liquid precursor 132 through which a gas from gas source 134 is bubbled. For example, gas source 134 can comprise argon. This provides a flow of evaporated reactant which is injected into plasma chamber 104 through inlet 136. The plasma chamber 104 receives the nanoparticles from chamber 102 through inlet 140. The pressure and temperature of the bubbler and the flow rate from gas source 134 can be adjusted to control the organic molecule density in the second stage chamber 104. Plasma chamber 104 comprises a parallel plate reactor configured as a continuous flow reactor, with particles being carried past the lower electrode plate 118 and into an exhaust blind 150 which carries a filter 152.

The first plasma chamber 102 can form nanoparticles in accordance with any appropriate technique. One example plasma based technique is shown and described in application Ser. No. 11/155,340 (now U.S. Pat. No. 7,446,335), entitled, PROCESS AND APPARATUS FOR FORMING NANOPARTICLES USING RADIO FREQUENCY PLASMAS, by Kortshagen et al. which is incorporated herein by reference in its entirety. As discussed below, the nanoparticles can be formed using any appropriate technique and are not limited to formation using a plasma.

As discussed above, the nanoparticles are received in the second stage 104. For example, second stage 104 can comprise a five inch diameter parallel plate reactor having a two inch plate gap. The nanoparticles can be received directly into chamber 104 and a separate orifice is not required. In this example, particles are nucleated and grown in the first stage 102 and the gas flow brings them into the second stage through inlet 140. The organic molecules are received into the second stage chamber through inlet 136 and can be adjusted to have a desired density. The second RF power supply 116 causes the molecular gas to break down and/or activate and bond with the nanoparticles. The flow continues through exhaust 150 and the nanoparticles, with the bonded organic molecules, are collected in a filter 152. The filter can comprise any appropriate filter, for example, a wire mesh filter. In one configuration, a pressure gauge 170 is provided in the exhaust 150 and can be used to monitor the pressure in the chamber.

The organic molecules can be selected as desired. Examples of organic molecules are shown below in Table 1. Various different bonds are formed between the carbon molecules and the nanoparticle and those are also shown in Table 1.

TABLE 1

Here G4SA refers to Group IV surface atoms including Si, Ge, C or any other Group IV element.

| NAME | STRUCTURE | BOND |
| --- | --- | --- |
| 1-dodecene | $H_3C$—$(CH_2)_9$—$CH$═$CH_2$ | G4SA-Carbon |
| Dodecane | $H_3C$—$(CH_2)_{10}$—$CH_3$ | G4SA-Carbon |
| Octyl-alcohol | $H_3C$—$(CH_2)_7$—OH | G4SA-Oxygen |
| 1-hexene | $H_3C$—$(CH_2)_3$—$CH$═$CH_2$ | G4SA-Carbon |
| 1-hexyne | $H_3C$—$(CH_2)_3$—$C$≡$CH_2$ | G4SA-Carbon |
| Hexane | $H_3C$—$(CH_2)_4$—$CH_3$ | G4SA-Carbon |
| Hexyl-alcohol | $H_3C$—$(CH_2)_5$—OH | G4SA-Oxygen |
| Hexyl-amine | $H_3C$—$(CH_2)_5$—$NH_2$ | G4SA-Nitrogen |
| 1-pentene | $H_3C$—$(CH_2)_2$—$CH$═$CH_2$ | G4SA-Carbon |
| Acrylic acid | $H_2C$═$CH$—COOH | G4SA-Carbon or G4SA-Oxygen |
| Allylamine | $H_2C$═$CH$—$CH_2$—$NH_2$ | G4SA-Carbon or G4SA-Oxygen |
| Ethylene-diamine | $H_2N$—$CH_2$—$CH_2$—$NH_2$ | G4SA-Nitrogen |
| Ethylene-glycol | HO—$CH_2$—$CH_2$—OH | G4SA-Oxygen |

The list set forth in Table 1 is not exhaustive and other materials and compounds may be used such as Decyl aldehyde (Decanal). In general, the following compounds can be delivered into the plasma and reacted with the particles:

Compounds with saturated carbon bonds, i.e. alkanes.

Compounds with one or more aromatic rings (benzene, toluene, mesitylene, pentacene etc.).

Compounds with unsaturated terminal functional group, i.e. alkenes and alkynes. Examples are 1-dodecene, 1-octadecene, 1-exene, 1-pentene, propene, butene, styrene, ethylene, acetylene, 1-pentyne etc.

Alcohols (—OH), thiols (—SH), amines (—$NH_2$), aldehydes (—CH═O), carboxylic acids (—COOH).

Compounds of point 3 and 4, but with more than one of the same functional group present in the same molecule. Examples are molecules such as 1,3 butadiene, ethylene glycol (ethane-1,2-diol), ethylene diamine, divinylbenzene.

Compounds of point 3 and 4, but with different functional groups present in the same molecule. Examples are allylamine, acrylic acid, mercaptopropionic acid.

Compounds containing any of the above mentioned functional groups but also containing one or more silicon atoms. Such compounds are usually referred to as organisilanes.

The molecular monomer to be grafted onto the particle surface may be solid, liquid or gaseous at room temperature. If gaseous, it may be delivered into the reactor from a compressed gas cylinder using any type of compatible flow meter; if liquid, a bubbler system may be used to saturate a carrier gas with the monomer; if solid, a sublimator may be used to saturate a carrier gas with the monomer. The carrier gas may be an inert gas (such as Argon, Helium etc.), a reactive gas (such as $H_2$), or it might be an organic monomer precursor itself (for instance, ethylene may be bubbled through 1-dodecene to deliver monomers of different length to the reactor, and to achieve mixed termination of the particle surface).

More than one monomer may be delivered into the reactor. This can be done by building a separate delivery line for each monomer, or (if both monomers are liquid) by mixing the two liquids and by using a bubbler to deliver the mixture to the reactor. More than one monomer can be delivered to the reactor to achieve mixed termination of the particle surface.

The organic molecule might contain one or more atoms of group III and V, such as P, As, B, Sb. Examples are triphenilphosphine, trioctylphosphine (TOP), trioctylphosphine oxide (TOPO), tributylborane, etc.

In one example experiment, 1-dodecene was reacted and used to bond with silicon nanoparticles. For this gas phase reaction 30 sccm of argon and 8 sccm of $SiH_4$ (5% in He) were provided in the first stage plasma reactor 102. Further, 15 sccm of argon was provided through the bubbler 130 which was maintained at the same pressure as the reactor (1.4 Torr). A power of 60 watts was used for the RF power supply 108 of the first reactor. A relatively low power (10-15 watts) was used for the second reactor 104 to successfully passivate the silicon particle surfaces. The resultant passivated nanoparticles were collected in the filter 152 and appeared to have a compact brown layer covering a stainless steel mesh of the filter. When the filter 152 was dipped into a solvent (toluene), the deposited nanoparticles began to disperse in the solvent. This dispersing occurred even without any sonication in the solution. A clear colloidal dispersion of silicon nanoparticles was obtained.

Figure 2:
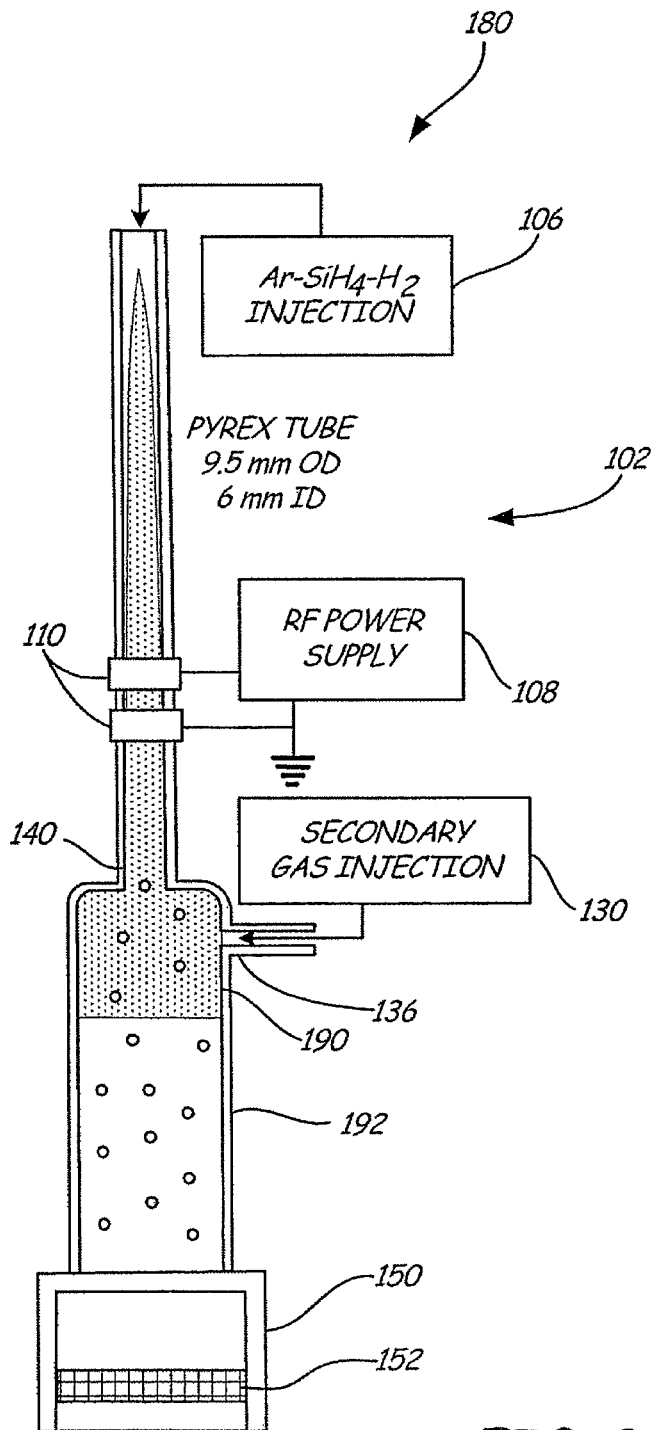
FIG. 2 is a simplified diagram showing a single stage plasma reactor in accordance with another example embodiment of the present invention.

FIG. 2 is a simplified diagram of another configuration of the present invention in which a single stage plasma reactor 180 is provided. Elements in FIG. 2 which are similar to those shown in FIG. 1 have retained that numbering. In the single stage plasma reactor of FIG. 2, the nanoparticles are nucleated and form nanocrystals as discussed above in the first plasma chamber 102. As the particles leave chamber 102, they are exposed to a plasma afterglow 190 in passivation chamber 192. Passivation chamber 192 is configured to receive the gas from an organic molecule source 130. If the plasma afterglow is sufficiently energetic to break down and/or activate the bonds of the organic molecules in the gas, these molecules will bond with the nanoparticles as discussed above.

As discussed above, the nanoparticles can be formed using any appropriate technique and are not required to be formed in a plasma chamber. However, if a plasma chamber is employed to form the nanoparticles, a single stage reactor may be possible in which the nanoparticles are passivated in the afterglow plasma from the production chamber. Although RF plasma chambers are discussed herein, other types of plasma chambers may also be used including DC, or microwave based plasma sources. Plasmas are desirable because they impart a negative charge to the nanoparticles and reduce the particle agglomeration rate.

The present application is applicable to Group IV nanoparticles which include pure Group IV elements as well as Group IV compounds which include other elements including doped particles. Specific examples of Group IV elements includes silicon and germanium. The nanoparticles may be produced just prior to their passivation, or may be produced separately, in time and/or location as desired. For example, the nanoparticles can be produced using a thermal process with a furnace and subsequently injected into a plasma chamber. The nanoparticles may be injected into the plasma chamber using any appropriate technique including injection in a liquid phase through an atomizer or the like, electrosprayed, etc. During the bonding, the Group IV nanoparticles are bonded with the organic molecules. Examples of bonds linking organic molecules to the Group IV nanoparticles include Si-carbon, Si-oxygen, Si-sulfur, and Si-Nitrogen bonds, or others based upon any Group IV element. The precursor used in passivation may be any appropriate gas, liquid or solid which may be injected into the chamber in a dispersed form. Although argon is discussed above as a carrier gas, the present invention is not limited to this configuration.

The passivated nanoparticles may be collected on a filter as discussed above, or collected using other collection techniques. One example includes bubbling the passivated nanoparticles through a liquid solvent.

Although the discussion above describes the passivation of a single type of nanoparticle, multiple types of nanoparticles may be passivated at the same time. Such a configuration, nanoparticles having desired concentrations are injected into the passivation chamber and bond with the injected organic molecules. Similarly, multiple types of organic molecules may be used in the bonding process. These bonding steps may be performed in a single chamber, or as the nanoparticles pass through multiple chambers. Any appropriate organic molecules may be used including those set forth above.

In one configuration, the first chamber can comprise any gas phase method used for the synthesis of nanoparticles such as, but not limited to, ultraviolet, thermal or plasma. Following the synthesis of the nanoparticles, the nanoparticles are then subjected to a passivation with organic molecules. In such a configuration, with the gas phase nanoparticles immediately followed by functionalization, problems associated with agglomeration are eliminated or significantly reduced and the resultant particles may be immediately processed in a solution without requiring additional steps. Electromagnetic radiation (including visible or ultraviolet) from the plasma can be used to assist in the bonding process.

Although the present invention has been described with reference to preferred embodiments, workers skilled in the art will recognize that changes may be made in form and detail without departing from the spirit and scope of the invention. As used herein, the plasma as set forth above may be any type of plasma including, "a gaseous medium that is partly ionized by the applications of a DC (direct current) or AC (alternating current) electric field. The electric field can be applied in continuous wave (CW) mode or in a pulsed mode. In the most general case, plasmas can be produced under gas pressures ranging from less than 1 Pa to exceeding $10^6$ Pa. The densities of the free charge carriers (electrons and ions) range from smaller than $10^{12}$ $m^{-3}$ to larger than $10^{22}$ $m^{-3}$. The temperatures of electrons may range from less than 0.1 electronvolt to more than 10 electronvolt. Temperatures of the heavy charge carriers (ions) may range from the temperature of the neutral gas (nonthermal plasma) up to temperatures equaling the electron temperature (thermal plasma)." Another definition of plasma, includes, "Gas pressures between 1 Pa to $10^5$ Pa, free charge carrier densities ranging from $10^{14}$ $m^{-3}$ to larger than $10^{18}$ $m^{-3}$, electron temperatures between 0.1 electronvolt and 10 electronvolt, and ion temperatures between room temperature and up to ~1000 Kelvin." Various flow rates of the materials through the reactor may be used. The flow rates through the functionalization plasma can range, depending on the size and throughput of the reactor to be designed, from a few sccm (cubic centimeter per minute at standard reference conditions) to many slm (liter per minute at standard reference conditions). More relevant than the flow rates are the residence times of nanoparticles in the reaction zone, which reasonably can range from around a millisecond to several seconds. Further, the present invention is not limited to the specific plasma source as set forth above. In various embodiments, reactions may be conducted in both low pressure gas environment and at gas pressures on the order of atmospheric gas pressure. At low pressures (1 Pa-1000 Pa) plasma can be produced through a number of plasma sources in both continuous and pulse discharged operation:

DC glow discharges
Radiofrequency (RF) capacitively coupled plasmas
Radiofrequency inductively coupled plasmas
Microwave produced plasmas in microwave resonators
Radiofrequency and microwave traveling wave produced plasmas such as, but not limited to, surface waves, helicon waves, electron cyclotron resonance discharges
Electron beam produced plasmas
DC and RF hollow cathode discharges At pressures closer to atmospheric pressures (1000 Pa-$10^6$ Pa), plasmas can be produced both in a continuos wave and a pulsed discharge operation by:

DC arc discharges
Radiofrequency (RF) capacitively coupled plasmas
Radiofrequency inductively coupled plasmas
Microwave produced plasmas in microwave resonators
Radiofrequency and microwave traveling wave produced plasmas such as, but not limited to, surface waves.
Electron beam produced plasmas
DC and RF microhollow cathode discharges
Corona discharges
Spark discharges
Dielectric barrier discharges
Atmospheric pressure glow discharges
Gliding arc discharges At both low pressures as well as close to atmospheric pressures, nanoparticles may be functionalized by either being directly exposed to the plasma zone containing the molecular precursors for surface functionalization, or by being exposed to the effluent (afterglow) of the plasma. The plasma breaks down (disassociates) and/or activates the molecules to achieve the desired reaction. The plasma can provide a source of reduction to assist in the process. Various nanoparticle sources include plasmas, thermal methods, laser pyrolysis, laser photolysis, laser ablation, liquid phase reactions, combustion processes and flame processes.

What is claimed is:

1. A method of producing substantially non-agglomerated, grafted Group IV nanoparticles, comprising:
synthesizing substantially nonagglomerated Group IV nanoparticles;
receiving the substantially nonagglomerated Group IV nanoparticles in a gas phase wherein the nanoparticles are suspended in the gas phase;
creating a plasma or an afterglow of a plasma to immerse the nonagglomerated nanoparticles and thereby causing the nonagglomerated nanoparticles to become negatively charged;
providing organic molecules to the nanoparticles; and
allowing the organic molecules to break down and/or become activated in the plasma or in the afterglow of the plasma and bond with the nanoparticles thereby forming organic passivation layers comprising carbon hydrogen bonds on the nanoparticles, wherein the passivation layers are bonded to the nanoparticles while in the plasma or in the afterglow of the plasma.

2. The method of claim 1 including collecting nanoparticles in a filter from the exit of the chamber.

3. The method of claim 2 including applying an RF signal to an electrode to form the plasma.

4. The method of claim 2 including injecting a gas into a liquid precursor to thereby bubble the liquid precursor and provide the organic molecules.

5. The method of claim 2 wherein the organic molecules are acetylene or methane.

6. The method of claim 2 wherein the organic molecules are provided in the afterglow of the plasma.

7. The method of claim 2 wherein the Group IV nanoparticles comprises silicon or germanium.

8. The method of claim 2 wherein the organic molecules are provided in the plasma of the nanoparticles.

9. The method of claim 1 wherein receiving nanoparticles comprises receiving doped nanoparticles.

10. The method of claim 1 wherein providing organic molecules comprises providing a liquid precursor.

11. The method of claim 1 wherein providing organic molecules comprises providing a solid precursor.

12. The method of claim 1 wherein providing organic molecules comprises providing a gaseous precursor.

13. The method of claim 1 wherein the passivation layers comprise molecular monomers bonded to the nanoparticles.

14. The method of claim 1 wherein the nanoparticles have a diameter of approximately 10 nm or less.

15. The method of claim 1 wherein the nanoparticles are synthesized in a plasma and are transferred to the receiving step in the gas phase.

* * * * *

UNITED STATES PATENT AND TRADEMARK OFFICE
CERTIFICATE OF CORRECTION

| | | |
|---|---|---|
| PATENT NO. | : 8,945,673 B2 | Page 1 of 1 |
| APPLICATION NO. | : 13/331168 | |
| DATED | : February 3, 2015 | |
| INVENTOR(S) | : Lorenzo Mangolini et al. | |

It is certified that error appears in the above-identified patent and that said Letters Patent is hereby corrected as shown below:

In the Specification

Column 1, Government Rights Section, Line 18:

"in this invention" should be -- in the invention --

Signed and Sealed this
Seventh Day of July, 2015

Michelle K. Lee
*Director of the United States Patent and Trademark Office*